May 12, 1959 R. C. NEWELL ET AL 2,885,819
BAIT BOX
Filed March 20, 1957

INVENTORS:
ROBERT C. NEWELL
and HOMER G. SCHOPF

BY: Beau, Brooks, Buckley & Beau,
ATTORNEYS.

United States Patent Office 2,885,819
Patented May 12, 1959

2,885,819

BAIT BOX

Robert C. Newell, Buffalo, and Homer G. Schopf, Clarence, N.Y., assignors to Curbell Industries, Inc., Buffalo, N.Y.

Application March 20, 1957, Serial No. 647,227

4 Claims. (Cl. 43—55)

This invention relates to fishing equipment and more particularly to an improved container or box for live bait.

As is well known, several kinds of live bait, such as earthworms, crayfish and the like, are sensitive to heat, light and both excess water and insufficient moisture, and the maintenance of such bait in good condition has presented a considerable problem to fishermen since the bait often must be transported for considerable distances to the fishing site, after which it may be necessary that the bait survive further hours in an open boat in hot summer weather, often with no protection save the bait container itself from the action of strong sunlight or, possibly, heavy rain, spray or water in the bottom of the boat. At the same time it will be appreciated that it is most desirable that any container for the bait be simple, compact and of maximum portability.

In accordance with the present invention, a bait box is provided which has the desirable qualities of simplicity, compactness and portability together with the capability of preserving the bait in good condition, fully sheltering the same from direct sunlight, and effectively preventing the entrance of unwanted water into the bait containing chamber so that there is no likelihood that the bait will drown, either from water in the bottom of a boat in which the bait box is placed, or from rain, spray or the like. At the same time the bait box has excellent insulating properties as well as ventilating means admitting air to even the bottom portion of the bait containing chamber, whereby the bait is maintained in the cool condition necessary for its survival.

Accordingly a primary object of the present invention is to provide an improved bait box.

Another object of the invention is to provide an improved bait box adapted to maintain bait in cool condition.

Another object of the invention is to provide a bait box as aforesaid having improved ventilation means providing ample air to bait in any portion of the bait containing chamber of the box while protecting such bait from sunlight, rain and the like.

Still another object of the invention is to provide an improved bait box as aforesaid of simple and inexpensive construction, utilizing advantageously a material which is inherently waterproof and has excellent insulating properties.

Still another object of the invention is to provide an improved bait box having the aforesaid qualities, embodied in a construction including a cover which provides an effective barrier against water and sunlight, and which is attached to the box body by a dual purpose hinge and handle structure in an unusually simple and sturdy manner.

Other objects of the invention will be apparent from the foregoing as well as from the following description and claims, and from the drawings wherein:

Figure 1:
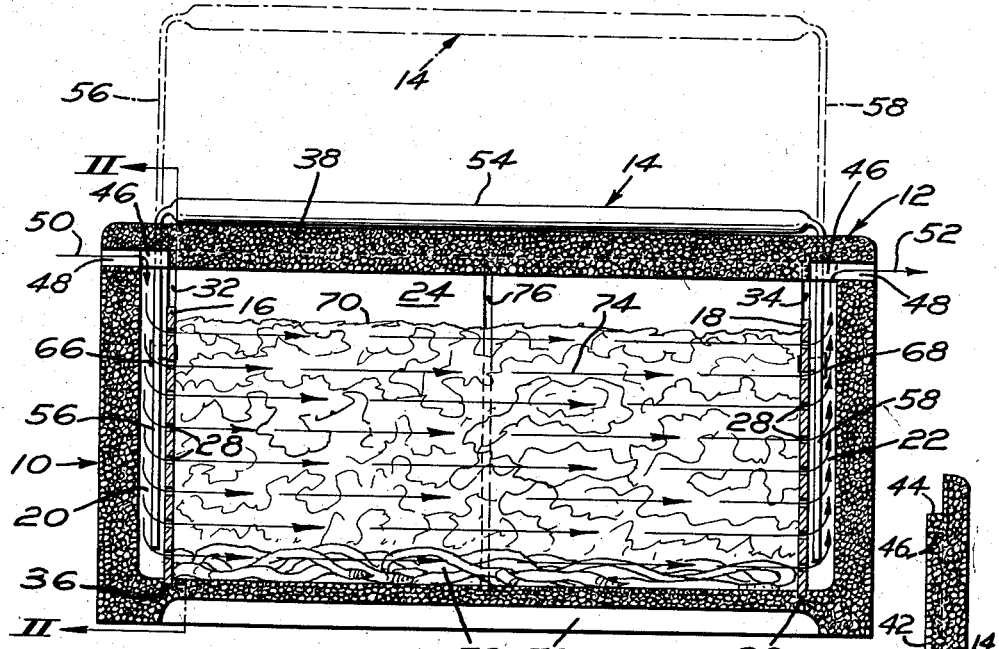
Fig. 1 is a sectional elevation view of a bait box embodying the invention.

Referring more particularly to the drawing, a preferred embodiment of the invention is illustrated to comprise a box body 10 to which a cover 12 is attached by a handle structure 14, as will be more fully described hereinafter. It is a feature of the invention that the box body 10 and the cover 12 are made from lightweight, inherently waterproof, readily moldable material having excellent heat insulating properties. Thus, in the preferred illustrated embodiment of the invention, the box body and cover members are each molded as a single piece from a material known in the plastic molding art as expandable polystyrene. This material, which is furnished commercially in bulk as small loose hollow beads, has the property of expanding under the action of heat so as to fill the cavity of a mold, the expansion arising from the expansion or puffing of each individual bead. At the same time, the action of the heat softens the outer surfaces of the beads so that they wet and weld together whereby the molded mass, after being cooled and removed from the mold, is characterized by a coherent, spongy structure in that it is composed of myriads of small air cells corresponding to the individual beads of the original material. Each bead is waterproof, and in a structural element of practicable thickness, as in the structure of the box described herein, the molded material is waterproof on account of the close nesting and welding together of the outer surfaces of these individual air cells. In other words, the walls of the box cover and body sides and bottom are preferably dimensioned to be at least thick enough to be waterproof, and are actually much thicker than that minimum, for providing adequate strength for withstanding ordinary, and even rough, handling. Expandable polystyrene beads of the aforesaid kind are manufactured and sold commercially by many manufacturers. The material after molding will be referred to herein as expanded polystyrene.

Means are provided to supply air to the bait to be kept in the box, and for this purpose the body 10 of the box is divided into separate bait and air chambers, this division being provided by a pair of foraminous partitions 16, 18 adjacent to but spaced from the opposite end walls of the box to divide the box body into air chambers 20, 22 and a bait chamber 24 therebetween. While the foraminous partitions 16, 18 may be of any suitable material installed in any practicable manner, it is of course preferred that the material of these partitions be resistant to water since the habitat of the bait contained in the bait chamber 24 will in most cases be moist. Further, as will be explained hereinafter, the partitions 16, 18 have a second function of mounting the handle structure of the bait box, in a combination handle and cover hinge arrangement, and therefore it is preferred that these partitions have considerable structural strength and be anchored in the box body in a secure manner. Accordingly, a preferred material for the partitions is one of the hard, tough, water-impervious plastics such as the material known in the plastics trade as "Hi-Impact Polystyrene."

In the preferred construction shown in the drawing, the partitions 16, 18 are of plate-like configuration and are formed with a plurality of air holes 28 throughout so as to provide for conduction of air through the partitions at all levels of the boundaries between the air chambers 20, 22 and the bait chamber 24. The partitions 16, 18 are further formed with serrated side edges 30, which seat in grooves 32, 34, respectively, formed in the side walls of the interior of the box body, the dimensions of the partitions being such that the serrated edges thereof bite into the walls of the box body at the base or root of each of the grooves 32, 34 with a snug fit so as to firmly engage the partitions in place in the grooves. As shown most clearly in Figs. 2 and 3, the teeth of the serrated edges 30 of the partitions are set to engage in barb or hook-like fashion in the somewhat soft box body material against movement of the partitions outwardly of the box body once they have been forced down along the grooves into the position of assembled relation in the box as shown. For providing added strength as well as finished appearance to the partition installation, the grooves 32, 34 are preferably continued across the bottom of the box, as shown at 36, 36, for receiving the bottom edges of the partitions 16, 18.

Figure 2:
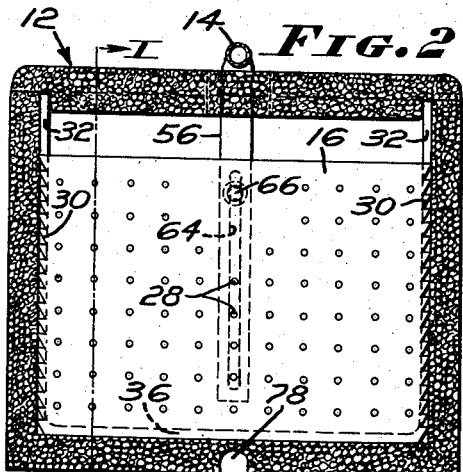
Fig. 2 is a sectional view taken about along line II—II of Fig. 1, showing the box with its cover in closed position as in Fig. 1 and including, at I—I, an indication of the line about on which the sectional view of Fig. 1 is taken.
Figure 3:
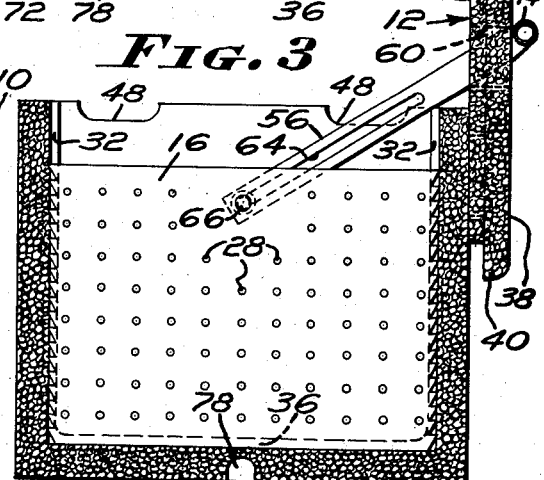
Fig. 3 is a sectional view similar to Fig. 2 but showing the cover of the box in open position.
Figures 4, 5:
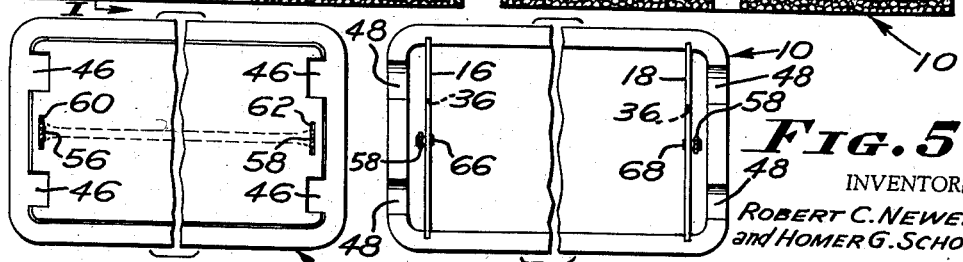
Fig. 4 is a bottom plan view of the cover of the box, on a reduced scale, with a central portion broken away.
Fig. 5 is a top plan view of the body of the box, on a similarly reduced scale and with a central portion similarly broken away.

For admitting fresh air to the air chambers 20, 22, the box cover and the box body wall portions are provided with cooperative formations shaped to define vents, leading to the box interior at the air chamber portions 20, 22 thereof while being adapted to protect the contents of the box from direct sunlight and to minimize the possibility of entrance of water such as from rain, spray or the like. As shown in the drawings, the box cover comprises a lid portion 38 including a peripheral lip portion 40 arranged to seat on the top edges of the box body wall portions, and an inward or downward projection or underportion 42 forming a cover locating and sealing shoulder 44 adjacent to the underside of the cover lip 40 in position to engage against the inner top edge portions of the box body walls. For providing the aforesaid vents the sealing shoulder 44 is formed with indentations 46, as most clearly seen in Fig. 4 of the drawing, and cooperative with these cover indentations 46, the box body walls are provided with indentations or notches 48 in position to register with the indentations 46 of the cover when the cover is in closed position on the box body. As shown in Figs. 1 and 2, the thickness of the downwardly projecting portion 42 of the cover forming the vertical walls of the indentations 46 is preferably at least approximately equal to the vertical depth of the body wall notches 48, and the body walls are preferably thick compared to the vertical depth of the wall notches, so that the resulting vent passages are sheltered and tortuous as shown at the arrows 50, 52, Fig. 1.

Although the expanded polystyrene material from which the box cover and body members are made has the aforesaid desirable qualities of watertightness, good insulating characteristics, lightness and, in the comparatively thick sections shown, durability, the material is nevertheless, due to its cellular nature, relatively soft and therefore not ideal for the formation of hinge or latch structures or the like. Accordingly, it is a feature of the invention that the box cover is maintained in assembled relation on the box body by the handle 14, and the partitions 16, 18 are given the additional function of providing an anchorage for this handle, whereby the load imposed by the handle on the box body is distributed over the wide area of anchorage provided by the serrated edges 30 of the partitions. In the illustrated arrangement the handle 14 comprises a U-shaped member having a base or grip portion 54 and opposite leg portions 56, 58 which pass through openings or slots 60, 62 formed through the cover for securement to the partitions 16, 18. Conveniently, the handle 14 may be formed from aluminum tubing or the like, bent into U-shape as shown, with the portions of the tubing forming the legs 56, 58 collapsed to have a flat cross-section. In any case, it is preferred that the legs 56, 58 be of strap-like shape so as to enable minimization of the size of the slots 60, 62 so that unnecessary leakage of light or water through these slots is avoided, especially where the openings 60, 62 are shaped to accommodate slanting motions of the handle legs relative thereto such as will be referred to hereinafter.

In the preferred structure, the handle legs 56, 58 are slotted longitudinally as shown at 64 for being journalled in a lost motion manner on studs 66, 68 securely fastened to the respective partitions 16, 18. As shown, the studs 66, 68 are positioned near the tops of the partitions 16, 18, and the slots 64 in the handle legs are dimensioned to permit the handle to be moved from the retracted or stowed position shown in full line in Fig. 1 to the extended or carrying position shown in phantom line in that figure. Also, the length of the cover slots 60, 62 through which the handle legs pass is made somewhat greater than the width of the handle legs 56, 58 so that the cover, journaled on the legs by the slots 60, 62, may be slanted with respect to the handle, so that as the handle is pivoted about the studs 66, 68, the cover may be brought to a stable open position overlapping and in alignment with the outer side of either of the two side walls of the box body parallel to the handle grip portion, one of these two opened positions being shown in Fig. 3.

It will be appreciated that the bait chamber 24 of the box shown provides well ventilated and protected storage for live bait, wherein the bait will be secure from heat, light and unwanted moisture. As required for certain kinds of bait, the user will introduce a controlled amount of moisture to the bait chamber 24, such as may be retained by an absorbent bait vehicle or habitat material which may be placed in the bait chamber 24; for example moss 70 may be placed in the bait chamber to provide a habitat for worms 72 or the like. The presence of such moss or like bait habitat forming material makes the feature of the air chambers 20, 22 of the ventilating system particularly important since air is thereby admitted directly to the moss, as indicated by the air flow arrows 74, including the lowermost portions of the moss as indicated, and, conversely, the admission of ventilation to the moss or other moist, porous bait vehicle 70 provides for limited evaporation therefrom, which, in cooperation with the sunlight-proof and insulated character of the box cover and body walls, maintains the box interior in desirably cool condition.

It will be understood that the particular air flow pattern indicated by the arrows 50, 74, 52 is for illustration only; actually the air may flow in either direction or both, as influenced by outside air currents.

As shown in the drawing, the moldability of the bait box enables ready provision of additional grooves 76 for a central partition (not shown), such as may be desired for separating different kinds of bait. Desirably, such a central partition would be foraminous and similar to the partitions 16, 18, although not necessarily anchored in place in the grooves 76. So also the bottom of the box body may be formed with a groove 78, if desired, to accommodate the grip portion of the handle of a box similar to the one shown when the two are stored in stacked relation.

While only one preferred embodiment of the invention has been shown and described in detail, it will be understood that the invention may be otherwise embodied within the spirit of the invention and the scope of the appended claims.

What is claimed is:

1. A bait box comprising a box body having bottom and side walls of waterproof cellular material and a cover of like material comprising a lid portion having a peripheral lip portion adapted to seat on top of said side walls, said cover having an underportion adapted to project into said box body and forming a cover seal and locator shoulder adjacent said lip portion, a pair of perforated partitions anchored in said box body parallel to opposite side walls thereof to divide the interior of said body into a central bait chamber and flanking air chambers, the top edges of said opposite side walls and said locator shoulder of said cover being provided with registering air vent depressions cooperative to provide tortuous air vent passages from the exterior of said box to said air chambers, handle means for said box adapted to secure said cover to said body comprising a U-shaped handle having a central grip portion and opposite end legs, and a lost motion attachment securing each leg of said handle to a respective one of said partitions, said cover being formed with openings passing and journaling said legs.

2. A bait box comprising a box body having bottom and side walls of waterproof cellular expanded polystyrene and a cover of like material comprising a lid portion having a peripheral lip portion adapted to seat on top of said side walls, said cover having an underportion adapted to project into said box body and forming a cover seal and locator shoulder adjacent said lip portion, a pair of foraminous partitions anchored in said box body parallel to opposite side walls thereof to divide the interior of said body into a central bait chamber and flanking air chambers, the top edges of said opposite side walls and said locator shoulder of said cover being provided with registering air vent depressions cooperative to provide tortuous air vent passages from the exterior of said box to said air chambers, handle means for said box adapted to secure said cover to said body comprising a handle having a central grip portion and opposite end legs, and attachment means securing each leg of said handle to a respective one of said partitions, said cover being formed with individual openings passing each of said legs.

3. A bait box comprising a unitary box body having bottom and side walls of waterproof cellular expanded polystyrene and a cover of like material comprising a lid portion having a peripheral lip portion adapted to seat on top of said side walls, said cover having an underportion adapted to project into said box body and forming a cover seal and locator shoulder adjacent said lip portion, a pair of perforated partitions disposed in said box body parallel to opposite side walls thereof to divide the interior of said body into a central bait chamber and flanking air chambers, the interior of said box body being formed with grooves adapted to receive the side edges of said partitions, said side edges being serrated along substantial portions of their lengths, the teeth of the serrations being disposed to bite into the box body material to anchor said partitions in place in said grooves, the top edges of said opposite side walls of said body and said locator shoulder of said cover being provided with registering air vent depressions cooperative to provide tortuous air vent passages from the exterior of said box to said air chambers, and handle means for said box adapted to secure said cover to said body comprising a U-shaped handle having opposite end legs having cross-sections which are flat and oriented transversely relative to the plane of the U-shape of the handle and a central grip portion, and lost motion attachment means securing each leg of said handle to a respective one of said partitions in a pivotal manner, said cover being formed with slots passing and journaling said legs, said slots and said lost motion attachment means being dimensioned and adapted to permit said cover to be raised and placed in lapping relation with a side wall of said body, outside of and in alignment with the same.

4. A bait box comprising a box body having bottom and side walls of waterproof insulating material and a cover of like material having a peripheral lip portion adapted to seat on top of said side walls, foraminous partition means anchored generally vertically in said box body in position to provide boundary means in said body between a bait chamber and an adjacent air chamber, the upper portion of said box being provided with lateral entranced air vent means arranged to admit air to said air chamber while sheltering the same from sunlight and rain, and handle means for said box comprising a grip portion and leg means, and attachment means adapted to secure said leg means of said handle means to said partition means, said cover being formed with opening means passing said leg means.

References Cited in the file of this patent

UNITED STATES PATENTS

| | | |
|---|---|---|
| 2,328,993 | Norling | Sept. 7, 1943 |
| 2,482,022 | Olson | Sept. 13, 1949 |
| 2,631,402 | Lastofka | Mar. 17, 1953 |
| 2,761,239 | Stamps | Sept. 4, 1956 |